United States Patent

[11] 3,583,235

| [72] | Inventor | Aimo Juhan Tanila<br>Pyhakumpu, Finland |
|---|---|---|
| [21] | Appl. No. | 774,409 |
| [22] | Filed | Nov. 8, 1968 |
| [45] | Patented | June 8, 1971 |
| [73] | Assignee | Outokumpu Oy, Toolonkatu<br>Helsinki, Finland |
| [32] | Priority | Apr. 17, 1968 |
| [33] | | Finland |
| [31] | | 1056/68 |

[54] APPARATUS FOR POSITIONING A THROUGH FLOW CELL IN A SAMPLING APPARATUS FOR LIQUIDS OR SLURRIES
1 Claim, 1 Drawing Fig.

[52] U.S. Cl. .................................................. 73/423, 73/421
[51] Int. Cl. .................................................. G01n 1/20
[50] Field of Search .......................................... 73/421, 432 PC

[56] References Cited
UNITED STATES PATENTS

| 3,464,272 | 9/1969 | Griffith et al. | 73/423 |
| 2,738,679 | 3/1956 | Senkowski | 73/423 |
| 2,808,580 | 10/1957 | Fuller | 73/432PC |
| 3,110,183 | 11/1963 | Logue | 73/423 |
| 3,259,462 | 7/1966 | Anscherlik | 73/421X |
| 3,279,260 | 10/1966 | Huntington | 73/423 |

Primary Examiner—Louis R. Prince
Assistant Examiner—Harry C. Post, III
Attorney—Albert M. Parker ABSTRACT: A line of continuously flowing material is reciprocately swung over a sample funnel to obtain a sample of the material. The sample is fed into a sample feeding pipe and from there to a through flow cell. The sample of material in the sample feeding pipe is automatically held at a substantially constant level, thus keeping the sample flow through the cell constant. The cell is positioned at least as high as the sample level for continuously maintaining a reduced pressure inside the cell.

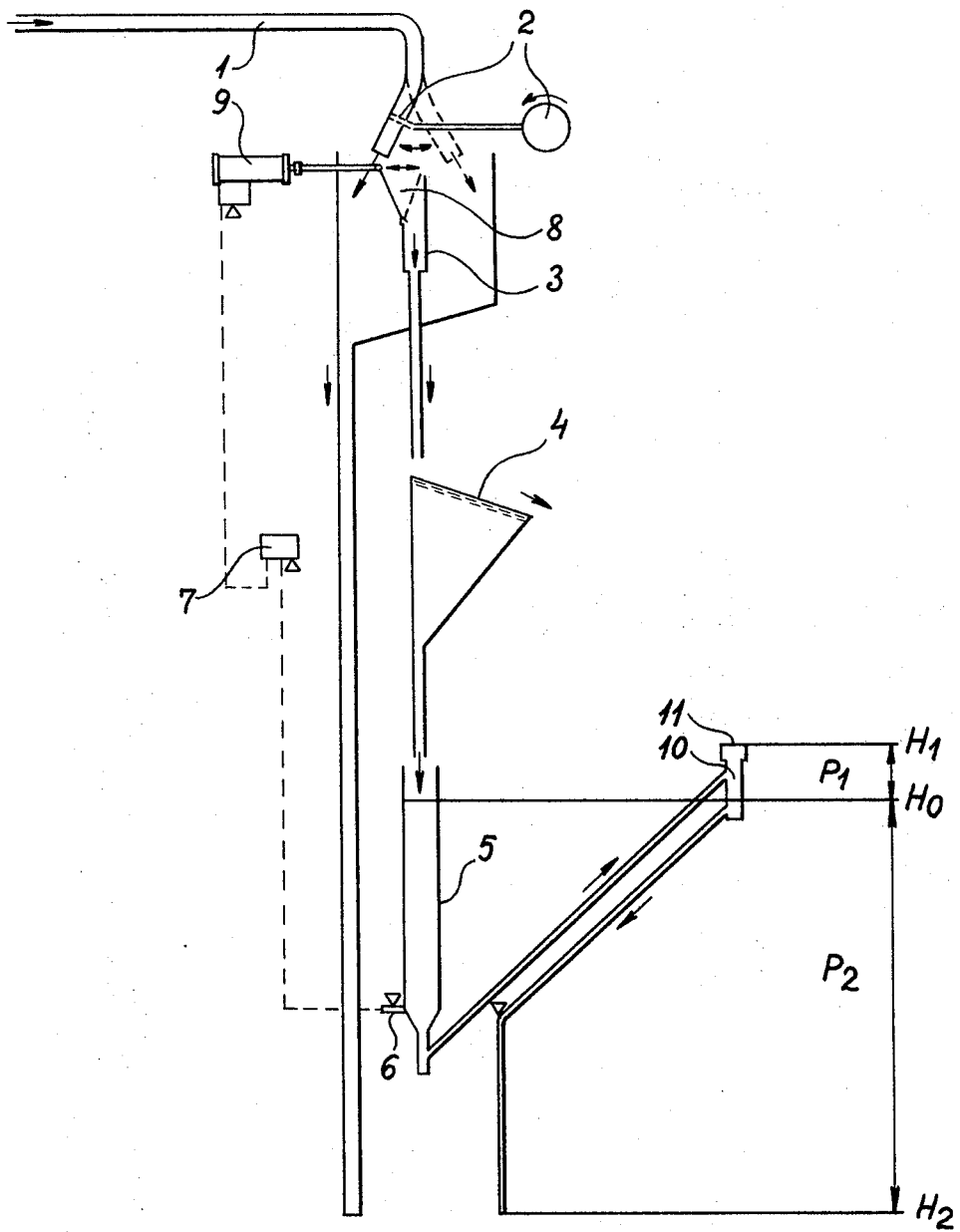

APPARATUS FOR POSITIONING A THROUGH FLOW CELL IN A SAMPLING APPARATUS FOR LIQUIDS OR SLURRIES

CROSS-REFERENCE TO RELATED APPLICATION

This application relates to a mode of positioning a through-flow cell which is particularly suitable for use in connection with the method disclosed in my copending application of even date, entitled "Method and Apparatus for Continuous Sampling of a Slurry Flow," the disclosure of which application is incorporated by reference herein in its entirety.

BACKGROUND OF THE INVENTION

1. Field of the Invention

This invention relates to a mode of positioning a through-flow cell in a continuously operating sampling apparatus for liquids or slurries.

2. Description of the Prior Art

Samples from suspensions of solids in water, or slurries, are among other things taken for purposes of chemical analysis. This concerns a certain portion of the slurry, which is entirely removed from the slurry flow being sampled. Various different arrangements are prior known for this so called batch sampling, a common feature of all of them being that the taken sample represents the total slurry flow during a short time interval. In other words the sample is a cross section of the total slurry flow at the moment of sampling.

With the development of continuously operating analyzers, sampling has undergone a substantial change. Depending on the type of analyzer utilized, additional requirements of varying degree are placed on sampling over those placed on batch sampling.

A very exacting analyzer with respect to sampling is the on-line x-ray fluorescence analyzer which places the following requirements on the sample.
1. The sample must be representative not only with respect to the contents of the various metals and the particle size distribution, but also with respect to the weight-per-volume of the slurry.
2. The sample flow must be continuous and of constant quantity, independently of variations in the process flow it represents, and must be controllable as to its quantity.
3. The sample must be free from solid impurities and air bubbles.
4. The pressure differential in the through-flow cell and outside of the same must be constant.
5. For the event of breakage of the cell window (most usually a thin Mylar or Melinex film) the opening of the x-ray tube must be protected from slurry splashes.

The development of the online x-ray fluorescence analyzer has been greatly impaired by the difficulty of sampling, with the resultant, at least partial, failure to meet the above requirements. The sampling method presently to be described will meet all the said requirements and is applicable not only to x-ray fluorescence analyzers but also, either as it is, or partially for sample pretreatment, to continuously operating analyzers of the type analyzing either a liquid or a solid sample separated from the slurry.

SUMMARY OF THE INVENTION

This invention relates to a mode of positioning a through-flow cell in a continuously operating sampling apparatus for liquids or slurries and the object of the invention is to provide a mode of positioning the cell, which permits protecting the analyzer against liquid or slurry splashes in case of breakage of the cell window.

The principal characteristics of the mode according to the invention comprises passing the sample flow through the said through-flow cell and positioning the said cell at the discharge level $H_0$ of the said sample flow or at a higher level $H_1$.

BRIEF DESCRIPTION OF THE DRAWING

The invention is described more fully in the following with reference to the accompanying drawing, which schematically and by way of an example illustrates the mode according to the invention of positioning the cell in the sampling apparatus disclosed in my copending application Ser. No. 774,408, filed Nov. 8, 1968 and entitled "Method and Apparatus for Continuous Sampling of a Slurry Flow."

DESCRIPTION OF THE PREFERRED EMBODIMENT

Referring to the drawing, slurry is shown flowing continuously in line 1, the downwardly extending end of which is suitably flexible so that it can be put into reciprocating swinging movement above a sampling funnel 3 by means of a device 2, the swinging movement having an amplitude large enough to cause a major portion of the slurry discharged from the line 1 to fall outside the sampling funnel. In this manner portions of batch sample character are continuously cut from the original slurry flow, said portion being combined to form a continuous sample flow, while the rest of the original slurry flow makes up a residual flow. The quantity of the sample generally is small compared with the residue.

The sample flows from the sample funnel 3 as a continuous flow through an inclined screen 4 into a feeding pipe 5, where the slurry level is maintained constant by control apparatus comprising a level sensing transmitter 6, a control instrument 7, and a regulating device 9 controlling an adjustable port opening 8. From the sample feeding pipe 5, preferably at its lower portion, the sample flow is passed further for analysis, e.g. into the cell of an x-ray analyzer.

In order to achieve such a constant sample flow, the level of slurry in the feeding pipe 5, indicated by $H_0$ in the drawing has to be kept steady, since it is the hydrostatic head which determines the flow, according to well known principles. The aforementioned level sensing transmitter 6, control instrument 7, and regulating device 9 cooperate to control the adjustable port opening 8 to provide a constant rate of sample flow through the pipe 5. If not controlled, the sample flow into the sample funnel 3 would vary with the process flow being sampled, and fluctuations in the sample flow through pipe 5 would result. This is avoided by control of the opening 8. Any increase in the process flow which causes a rise in the liquid level in the pipe 5 will be sensed and a signal will be transmitted by the level sensing transmitter 6 to the control instrument 7. The instrument 7 will then actuate the regulating device 9 to decrease the opening 8. The closing of opening 8 will slow down the flow rate by limiting the amount of slurry entering the funnel 3, until the liquid level in the pipe 5 is lowered to the desired level.

By virtue of the cooperative effects of the above-mentioned functions, the apparatus can be tuned into a condition of equilibrium, that is, a constant rate of flow through cell 10. Since the flow is continuous the flow rate depends mainly upon the height of the discharge level $H_0$ in the feeding pipe 5. If the liquid level $H_0$ rises, the flow rate increases accordingly. Thus a condition of equilibrium exists when the sample flow is maintained constant as to its quantity as stated above. Because of the presence of the control apparatus, variations in the process flow being sampled will not cause the discharge level $H_0$ or the flow rate through the cell 10 to change.

The system of the invention has several advantages:
1. The sample is a representative portion of the slurry flow.
2. The sample flow is maintained constant as to its quantity. The effect on the pressure $P_2$ of variations in the weight-per-volume of the sample can be neglected, since said variations even in the slurry flow generally are minor and when necessary can be compensated for.
3. The reduced pressure in the through-flow cell 10 is constant resulting in that the force applied against the cell window 11 is constant and in that the sample circulation automatically stops in case of window breakage.

4. Discontinuation of the sample flow causes the adjustable port 8 to close whereby the slurry flow totally bypasses the apparatus. The residual flow then equals the slurry flow.
5. In case of breakage of the window 11 the reduced pressure prevents the sample slurry from splashing outside of the cell 10 and thus protects e.g. the x-ray tube etc.
6. By virtue of the screen 4 the sample is free from impurities which otherwise could adhere to the through-flow cell 10.
7. Since the sample is taken to the through-flow cell from the lower portion of the inlet pipe 5, the sample is free also from air bubbles.

In operation, once a continuous flow is established through the cell 10, a reduced pressure prevails at the cell 10 because of the cell's position at the discharge level $H_0$ (or higher at $H_1$). There is a siphon effect which depends upon the raised position of the cell 10 relative to the lower level $H_2$. It is clearly shown in the drawing that the starting level $H_0$ or $H_1$ is substantially higher than $H_2$ which difference in height accounts for the reduced pressure at the cell 10. Since the heights are fixed during constant flow the underpressure is constant.

Sample flow through the cell 10 is automatically stopped when the window 11 breaks because air will flow through the broken window more easily than slurry from the feeding pipe 5 because of the reduced pressure. The outlet from the cell 10 downwards is drained and the hydrostatic pressure $P_2$ (as shown in the drawing) is broken. This is a well known consequence of the siphon effect and will be readily understood by those skilled in the art.

When the sample stops flowing and there is no slurry flow from the feeding pipe 5, the liquid level in the pipe 5 starts to rise above the level $H_0$. This causes the control instrument 7 to actuate the mechanism 9 closing the port opening 8. Thus any break in the sample flow from the feeding pipe 5 will cause the adjustable port 8 to close.

I claim:
1. A continuously operating apparatus for sampling liquids or slurries by passing a sample through a through-flow cell for analysis, comprising: a line for continuously carrying a flow of material and means for taking a representative sample of the material; a sample funnel for collecting the sample; a sample feeding pipe for receiving the collected sample and passing the sample on to the through-flow cell; means for automatically keeping the sample in the feeding pipe at a substantially constant level and for keeping the sample flow rate to the through-flow cell substantially constant by controlling the sample-taking means; said through-flow cell being positioned at least as high as the sample level in the feeding pipe for continuously maintaining a reduced pressure inside the through-flow cell.